Jan. 28, 1958 A. LATOUR 2,821,594
ELECTRODYNAMIC COMPENSATION DEVICE FOR PRESSURE CONTACTS
Filed Jan. 10, 1955 6 Sheets-Sheet 1

INVENTOR
ANDRÉ LATOUR.
BY
ATTORNEY

Jan. 28, 1958 A. LATOUR 2,821,594
ELECTRODYNAMIC COMPENSATION DEVICE FOR PRESSURE CONTACTS
Filed Jan. 10, 1955 6 Sheets-Sheet 2

INVENTOR
ANDRÉ LATOUR.
BY
ATTORNEY

Jan. 28, 1958         A. LATOUR         2,821,594
ELECTRODYNAMIC COMPENSATION DEVICE FOR PRESSURE CONTACTS
Filed Jan. 10, 1955         6 Sheets-Sheet 5

INVENTOR
ANDRÉ LATOUR.
BY
ATTORNEY

Jan. 28, 1958     A. LATOUR     2,821,594
ELECTRODYNAMIC COMPENSATION DEVICE FOR PRESSURE CONTACTS
Filed Jan. 10, 1955     6 Sheets-Sheet 6

INVENTOR
ANDRÉ LATOUR.
BY
ATTORNEY

United States Patent Office 2,821,594
Patented Jan. 28, 1958

2,821,594

ELECTRODYNAMIC COMPENSATION DEVICE FOR PRESSURE CONTACTS

André Latour, Grenoble, France, assignor to Etablissements Merlin & Gerin, Grenoble, France Application January 10, 1955, Serial No. 480,952

Claims priority, application France February 4, 1954

19 Claims. (Cl. 200—87)

The invention relates to circuit-breakers in which the current leads are substantially parallel in the vicinity of the contacts.

Disconnecting switches are known in which a stationary and a movable conductor, respectively ending at said contacts and having substantially rectilinear length portions extended parallel and close to each other when the switches are closed, said movable conductor forming the carrying arm of the movable contact and being disposed in position to react magnetically, in closed position of the contacts with said stationary conductor in a direction to urge said movable contact against the stationary contact.

A primary object of the invention is the provision of a device of the aforesaid type in a circuit-breaker, without danger for the arc to be repelled towards the conductors by the magnetic forces developed after the separation of the contacts.

With these objects and problems in view, the invention, for the electrodynamic compensation of the separating forces between the contacts of the stationary and movable members in contact apparatus, provides for a certain arrangement of the incoming and outgoing conductors by means of which repulsive forces are intentionally developed between these conductors but are advantageously utilized for increasing the pressure between the contact members.

The fundamental principle underlying the invention will be best explained with reference to the schematical diagrams shown on Figs. 1 to 4 of the drawings. The various specific features and objects of my invention will become furthermore apparent as the ensuing specific description of the invention proceeds in which various embodiments of the invention will be described by way of example with reference to other figures of the accompanying drawings.

These drawings are to be understood explicative of my invention but not limitative of its scope. Other embodiments incorporating the principle underlying my invention are feasible without departing from the spirit and ambit of my appended claims.

In the diagrams of Figs. 1 to 4, and also in the subsequent figures, as well as in the ensuing specification, the current is assumed, only for the purpose of illustration, to flow in the direction from the stationary contact member to the movable contact member.

Figure 1:
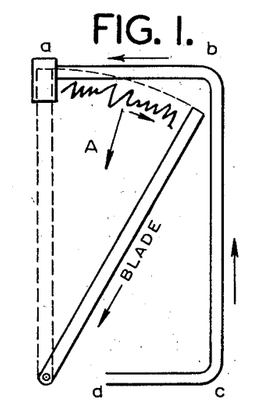
Figures 1 and 2 are diagrams showing respectively a known arrangement applied to a circuit-breaker, and the arrangement according to the invention.

The diagram of Figure 1 illustrates a known arrangement for a disconnecting switch, and supposed to be applied to a circuit-breaker. The arrangement would involve the inconvenience that strong repulsion in direction of arrow A is produced on the arc as a consequence of the loop formed by the portion $a\ b$ of the stationary conductor and the arc.

Figure 2:
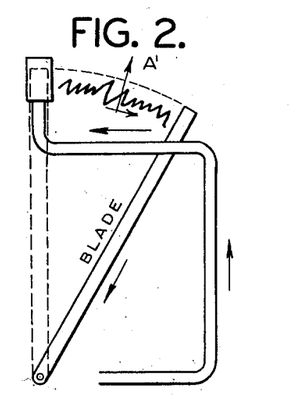

The diagram of Figure 2 illustrates an arrangement according to the invention whereby the arc is repelled in the direction of arrow A', that is, in an outwards direction, thus avoiding the inconvenience which renders the known arrangement inapplicable to a circuit breaker.

The device of the invention for the electrodynamic compensation, in contact apparatus, of the separating forces between the stationary and movable contacts, provides for a particular arrangement of the stationary and movable conductors which end at the stationary and movable contacts. These conductors have substantially rectilinear length portions, parallel to each other, particularly as seen projected upon a plane normal to the direction of initial separation of the contacts, that is, referred to the drawing, a plane normal to the plane of the drawing and normal to arrow F.

The conductors, furthermore, as seen projected upon the plane of the movement of separation of the contacts— or a plane coinciding with or parallel to the plane of the drawing—cross each other at least once near the contacts and the ends of the rectilinear length portions without however electrically contacting each other. The conductors, seen in the same projection, will cross each other a second time, remote from the first crossing, near the other ends of the rectilinear length portions. In this projection the rectilinear length portions and the crossing will thus form a closed loop.

Figure 3:
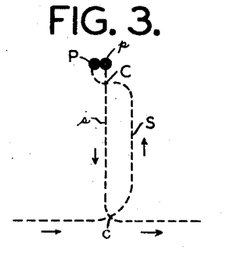
Fig. 3 is a diagram illustrating the principle of an arrangement in accordance with my invention.

Fig. 3 illustrates the principle of such an embodiment of the invention. The incoming or stationary conductor S which leads the current to the stationary contact P forms with the outgoing or movable conductor s, which leads the current from the movable contact p, a closed loop, the conductors S and s crossing each other, once at C and a second time at c. Within the loop the current flows in the conductors S and s in opposite directions, the conductors thus repulsing each other. A force is thus produced which presses the contacts P and p together and thus furnishes the desired increase of the pressure between these contacts P and p.

In order to make possible in this arrangement with crossed conductors the displacement of the mobile contact p—in the drawing to the right—the conductors S and s are disposed in different planes, parallel to the plane of the drawing, or the conductors are so disposed that, when seen projected upon a plane perpendicular to the direction of initial separation, their rectilinear length portions are parallel to each other. The movable contact p with its conductor s may thus pass at the side of the conductor S of the stationary contact P. Since this arrangement, however, is asymmetric, the electrodynamic forces developed will produce an oblique component.

This oblique component of the repulsive forces may be avoided or compensated when, in accordance with a further development of the invention, one of the conductors, preferably the stationary conductor, in the instance illustrated the conductor S, is constituted by two branch conductors whose projections upon a plane normal to the direction of initial separation of the contacts are symmetrically disposed at both sides of the projection upon this plane of the other, the single conductor; the projections of the branch conductors upon the median symmetry plane through this single conductor coinciding. This will be more fully explained and illustrated with specific reference to the embodiments and modifications of Figs. 5 to 19.

In a further development of the invention, attractive as well as repulsive forces will be developed between the stationary and movable conductors of a contact apparatus or circuit breaker.

Figure 4:
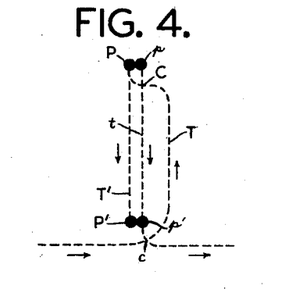
Fig. 4 is a diagram illustrating a further development of the arrangement of Fig. 3.

The principle of this development of the invention is illustrated in the diagram of Fig. 4.

The contact making face of each contact member is subdivided into two distinct contact regions P, P' and p, p' in spaced relationship to each other. One of the contact regions P and p of each member is disposed at the end of the appertaining conductor, T and t, respectively. The second contact region p' of one member is provided upon the loop forming conductor t of this member near the remote end of its rectilinear length portion. The second contact region P' of the other contact member is connected to the first contact region P by a supplementary conductor T' with a substantially rectilinear length portion parallel to the rectilinear length portions of the other loop forming conductors. In the instance illustrated, the current thus arrives at the contact points or regions P, P' through the conductors T and T' and leaves the contact points or regions p and p' through the conductor t passed between the conductors T and T'. The currents thus flow along the conductors T and t in opposite directions, repulse each other and, since they are crossed near the contacts P, p, augment the contact pressure. The conductors T' and t, on the other hand, carry currents in the same sense so that again, since these conductors are not crossed, the pressure between the contacts is augmented.

Repulsive and attractive forces thus are effective upon the contacts in the same sense and both increase the contact pressure as a function of the current.

Specific embodiments of the invention as applied to circuit breakers will now be described with reference to Figs. 5 to 19 of the drawings.

In these figures only the essential elements necessary for the explanation and illustration of the invention have been shown, thus the contacts of the stationary and movable contact members with their conductors. Of the other elements, such as the framework and the movable equipment, only those parts have been shown which are in proximity to those contacts, the more so, since those elements, other than the contacts and the conductors ending thereat, may be of any conventional or convenient type.

Figure 5:
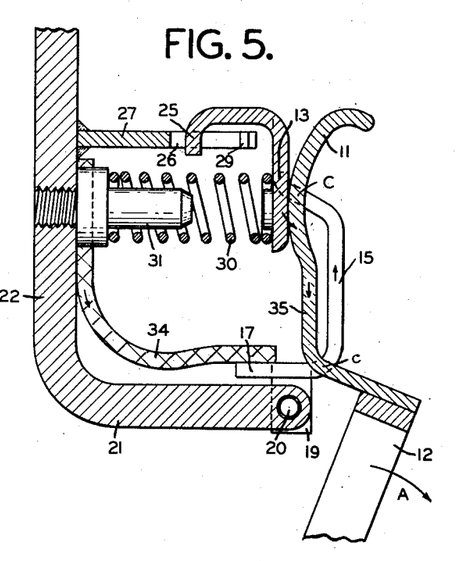
Fig. 5 is an elevational section, along line 5—5 of Fig. 6, of an arrangement of the stationary and movable contact members in a circuit breaker, in accordance with the invention and based upon the principle illustrated in Fig. 3.
Figure 6:
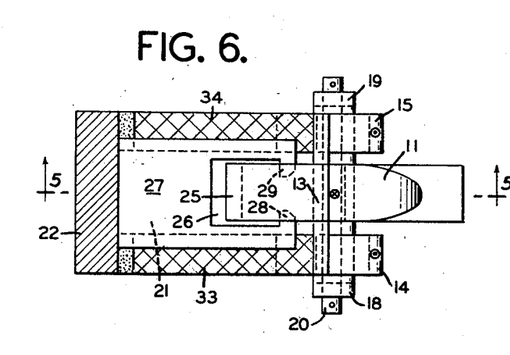
Fig. 6 is a top view of the arrangement of Fig. 5.
Figure 7:
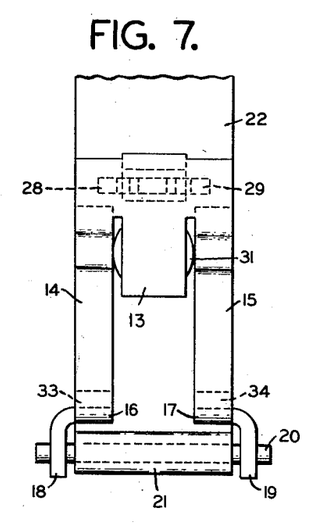
Fig. 7 is a front view of the arrangement of the stationary contact member, seen from the right hand side of Fig. 5 or 6.

The various embodiments are shown in Figs. 5, 6; 8, 9; 11, 12; 14, 15; and 17, 18 in the closed positions whereas Figs. 7; 10; 13; 16; and 19 illustrate the front views of the various stationary contacts with the movable contacts open or removed.

In the embodiment of Figs. 5 to 7 the movable contact, designated by 11, is carried at the head of the arm 12 of the movable contact member and is secured thereto by any convenient means. The contact arm may be moved into the open position by any convenient or conventional means and in any manner, for instance by being pivoted towards the right, as indicated by the arrow A, about an axis not shown here. 13 is the stationary contact, in the instance of Figs. 5 to 7 bent of one piece of sheet metal with the lateral branch conductors 14, 15. From the rearwards bent foot pieces 16, 17 of the branch conductors, ears 18, 19 are bent downwards by means of which the stationary contact member is pivotal about an axle or pin 20 mounted at the foot 21 of the bracket or framework 22 of the circuit breaker.

The head of the stationary contact piece 13 is bent rearwards and downwards and enters with its downwardly directed finger 25 into the cut-out 26 of a guide piece 27 secured to bracket 22 and guiding the pivotal movement of the stationary contact member about pivot 20, the forward movement of this member being limited by the abutment prongs 28, 29 of the guide piece 27.

A compression spring 30 is tensioned between the bracket 22 and the stationary contact 13 and is centered about a bolt 31 secured to the bracket 22. The spring presses the stationary contact member to the right and, in the closed position of the circuit breaker, against the movable contact 11 thus determining the contact pressure as far as the mechanical structure is concerned.

The two branch conductors 14, 15 are provided at their foot pieces 16, 17 with the flexible strands 33, 34, connecting the stationary contact member with the one terminal of the network, for instance for the incoming current, this connection not being shown here since it forms no part of the invention. For the same reason, the leads to the movable contact member have not been shown in these nor in the subsequent figures.

As Figs. 5 to 7 illustrate, the branches 14, 15 of the stationary conductor form with the body 35 of the movable conductor a closed loop as seen in projection upon the median symmetry plane of the movable contact or the plane of the movement of separation of the movable contact, the conductors crossing each other at "C" near the place of contact and a second time at "c" remote therefrom. Between both crossings, the single movable conductor as well as the branch conductors of the stationary contact are shaped with substantially rectilinear length portions, 35, and 14, 15, respectively, as seen projected upon the median symmetry plane of the movable contact member as well as projected upon the plane normal thereto and normal to the direction of initial separation of the contacts, that is the direction in which the opening movement of the movable contact member is initiated or when this member is pivoted in the sense of arrow A.

Along the conductors 14, 15, on the one hand, and conductor 35, on the other hand, the current circulates in inverse sense as the arrows and the small dot and cross circles indicate. Repulsion between the conductors which constitute the loop is thus produced tending to open the loop and, since the conductors are crossed in proximity to the contacts, the contacts are pressed together with great force.

When, from the closed position, shown in Figs. 5 and 6, the circuit breaker is to be opened and the contacts 11, 13, are to be separated from each other, the contact 11 is displaced towards the right, taking with it the contact 13 which, under the combined action of spring 30 and the electrodynamic forces developed between conductors 14, 15 and conductor 35, remains firmly attached to contact 11 until the moment when finger 25 of contact piece 13 reaches the prongs 28, 29. At this instant, the forward movement of contact 13 is abruptly stopped whilst the movable contact 11, now accelerated to its full velocity will, under the momentum acquired, continue its course with full velocity. Contacts 11 and 13 thus are abruptly separated.

On the other hand, the inertia of the movable contact member as well as the electrodynamic forces which eventually will act upon the movable contact arm will suffice, at least on the short course necessary, to overcome the repulsive forces effective between conductors 14, 15 and conductor 35. On its further path, conductor 35 then traverses the branch conductors 14, 15, or, as seen in the projection upon the plane of the drawings, the position where conductor 35 coincides with the branch conductors 14, 15. With this moment, the repulsive forces change their direction and are now operative in the sense of separating the contacts, instead of, as before, pressing them together. In any case, the arc which is drawn between the contacts 11 and 13 is well driven upwards, of the figure, and the same would occur should the arc be ignited between the conductors 14, 15 and conductor 35.

Figure 8:
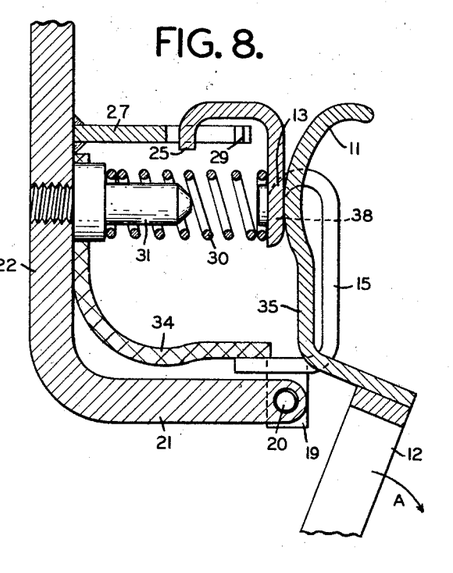
Fig. 8 is an elevational section, along line 8—8 of Fig. 9, of a modification of the arrangement of Figs. 5 to 7.
Figure 9:
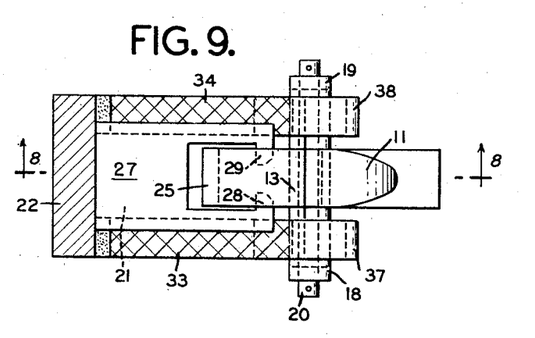
Fig. 9 is a top view of the arrangement of Fig. 8.
Figure 10:
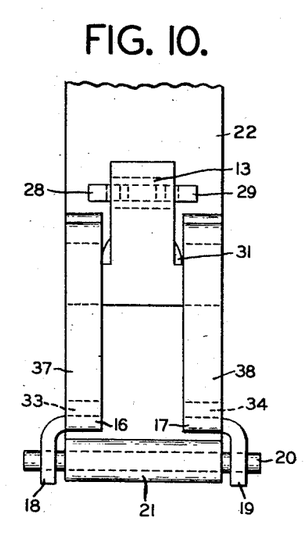
Fig. 10 is a front view of the arrangement of the stationary contact member, seen from the right side of Fig. 8 or 9.

Figs. 8 to 10 illustrate a similar arrangement with the difference however that instead of being bent in S-form as shown in Figs. 5 to 7, the branch conductors 37, 38 of the stationary contact member are cut and bent downwards from the contact plate 13 proper in reversed U-form.

Figure 11:
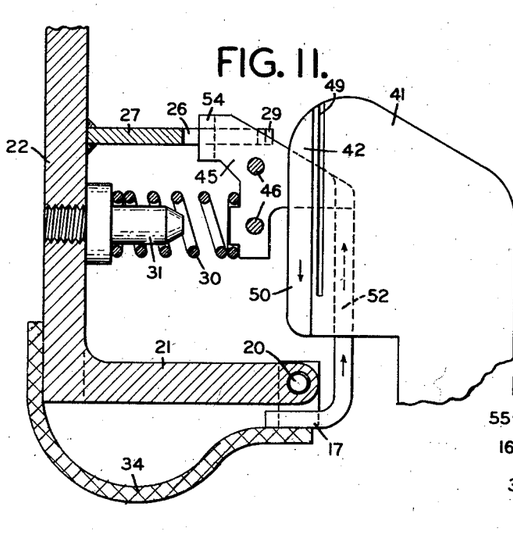
Fig. 11 is an elevational section along line 11—11 of Fig. 12, partly in view, of another embodiment of the invention, based upon the principle illustrated in Fig. 3.
Figure 12:
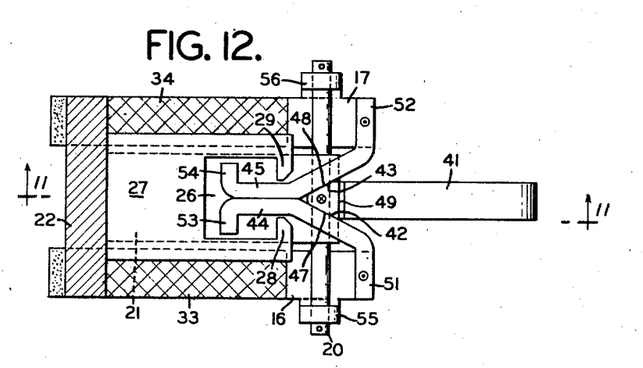
Fig. 12 is a top view thereof.
Figure 13:
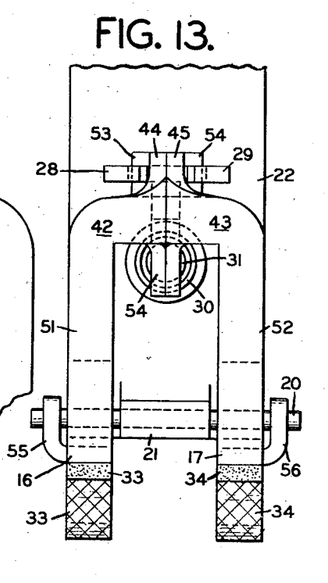
Fig. 13 is a front view of the arrangement of the stationary contact member, seen from the right hand side of Fig. 11 or 12.

The embodiment of Figs. 11 to 13 is likewise based on the principle of Fig. 3. In this embodiment two regions or areas of contact are provided symmetrically at both sides of the median symmetry plane through the movable contact.

The movable contact 41 is in form of a thick blade having a contact edge constituted by two faces 42, 43 inclined towards each other under an angle, in the example illustrated of about 60°, an angle which, however, may be smaller or greater and will be so chosen that in the closed position of the circuit breaker there is no wedging or, in other terms, that the contact members in the closed position are contacting each other merely by pressure without any substantial frictional engagement.

The stationary conductor with its branches or wings 51, 52 consists of a pair of symmetric leaves of sheet metal, symmetrically shaped and bent and secured together at their juxtaposed flanges 44, 45 by means of rivets 46, for instance. The leaves diverge in V-form from their joined flanges as a pair of contact faces 47, 48 forming an angle corresponding to that of the edge of the movable contact blade.

Two regions or areas of contact are thus obtained 42, 47 and 43, 48, both equally pressed together by compressing forces acting in parallel.

In order to make possible for the threads or lines of current to form, in accordance with the invention, a loop, the contact piece 41 is provided with a narrow slot or "saw-cut" 49 extended downwardly from the upper edge of blade 41 and perpendicularly and transversely of the median symmetry plane of the blade. This cut may be filled with a solid insulating material. The rectilinearly extended conductive path 50 at the one side of the cut together with the downwardly bent wings or branches 51, 52 of the stationary contact member on the other side of the slot, as seen in the side projection of Fig. 11, form the intended closed loop for the generation of the repulsive forces which are to increase the contact pressure. The current, arriving through strands 33, 34 flows upwards the branch conductors or wings 51, 52, passes the contact zones 42, 47, and 43, 48 and then flows downwards the conductive path 50 into blade 41.

The stationary contact member is mounted at the foot piece 21 of bracket 22, yieldable against the action of spring 30 and pivotal about the axle 20 by means of ears 55, 56 bent upwards from the foot pieces of wings 51, 52, respectively.

At the upper ends of the flanges 44, 45 the edges of the leaves are bent laterally and thus form ears 53, 54 which, when abutting against the prongs 28, 29, limit the deflection of the stationary contact member when the circuit breaker is being opened or is open.

The embodiments of Figs. 14 to 16 and Figs. 17 to 19 are based upon the principle discussed with reference to Fig. 4. In both embodiments four regions of contact are utilized. In the device illustrated in Figs. 14 to 16, the movable contact is a relatively thick blade 57 and the contact edge is constituted by two faces inclined towards each other under an angle, as described hereinabove. Each contact side, in accordance with this development of the invention is shaped with interrupted lines of contact separated by a median slight depression 58, 59, respectively, on each side of the blade edge, two zones of contact 60, 61 and 62, 63, respectively, thus being formed. The stationary contact is again composed of two leaves secured together at their flange parts 44, 45 by rivets 46. Diverging from these flange parts are the contact faces 64, 65 which form an angle corresponding to that at the edge of the blade.

Figures 14, 16:
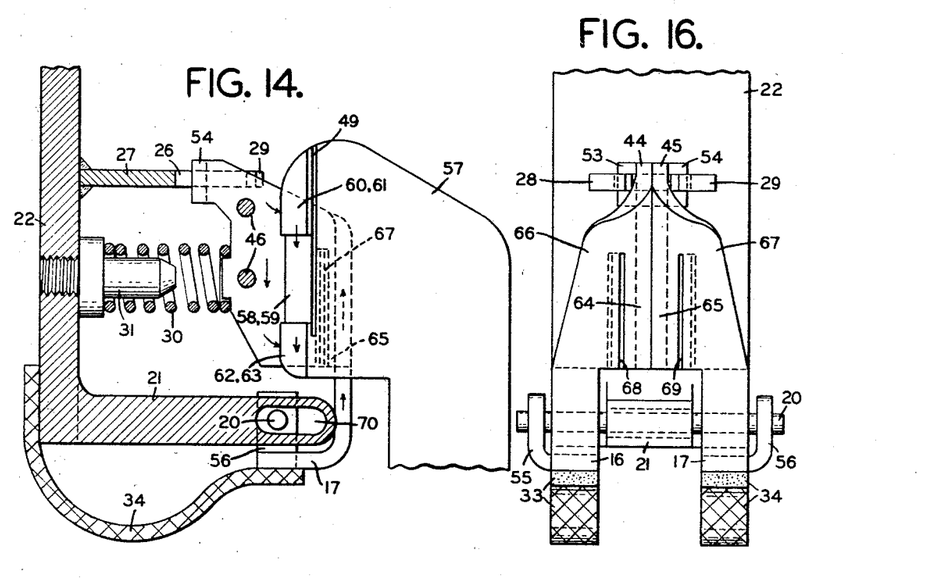
Fig. 14 is an elevational section, along line 14—14 of Fig. 15, partly in view, of an arrangement of the stationary and movable contact members in a circuit breaker similar to that of Fig. 11, however based upon the principle illustrated in Fig. 4.
Fig. 16 is a front view of the arrangement of the stationary contact member, seen from the right hand side of Fig. 14 or 15.
Figure 15:
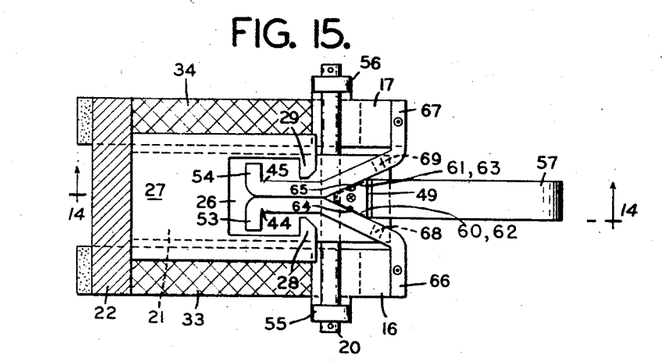
Fig. 15 is a top view thereof.

From the contact faces, the leaves are laterally and downwardly bent and form lateral wings or branch conductors 66, 67 from which the foot pieces 16, 17, respectively, are bent rearwards.

The contact blade 57 is provided, starting from its upper edge with a narrow slot 49 and so are the contact wings 64, 65, the slots 68, 69 however starting from the lower edges of the wings. A current path is thus provided, as seen on Fig. 14, starting from the strands 33, 34 upwards the lateral wings 66, 67 to the right of slots 68, 69 through the contact regions 65, 60 and 65, 61 and parallel thereto through the contact regions 65, 62 and 65, 63 into the conductive path of blade 57 to the left of slot 49 and down the blade. The slots thus compel the current to flow along the current path to the left of the slot in the blade in the one sense and along the current path to the right of the slots in the stationary conductor wings in the opposite sense. As seen projected upon the plane of Fig. 14, the conductive paths, similar to the diagram of Fig. 4, are crossed above and below the rectilinear length portions of the conductors and thus form, as seen in their projection, a closed loop. Additionally, upper and lower contacts are connected through straight conductive paths within which the current flows in the same sense. The simile of Fig. 4 is thus realized; under current attractive and repulsive electrodynamic forces are induced which both cooperate in increasing the contact pressure.

In order to allow the stationary contact to recede under the pressure of the movable contact without the risk that the contact zones 58, 64; 60, 65, on the one hand, and 69, 64; 61, 65, on the other hand, be unequally subjected to the pressure exerted by spring 30, a certain play is given to the axle 20 so that it may recoil or move rearwards. This is achieved, for instance, by providing a slot 70 within the foot 21 of bracket 22. Abutments or prongs 28, 29 at the guide piece 27 and projections 53, 54 at the leaves of the stationary contact member are provided as described with reference to Figs. 11 to 13 for limiting the outward deflection of the stationary contact member.

Figures 17, 19:
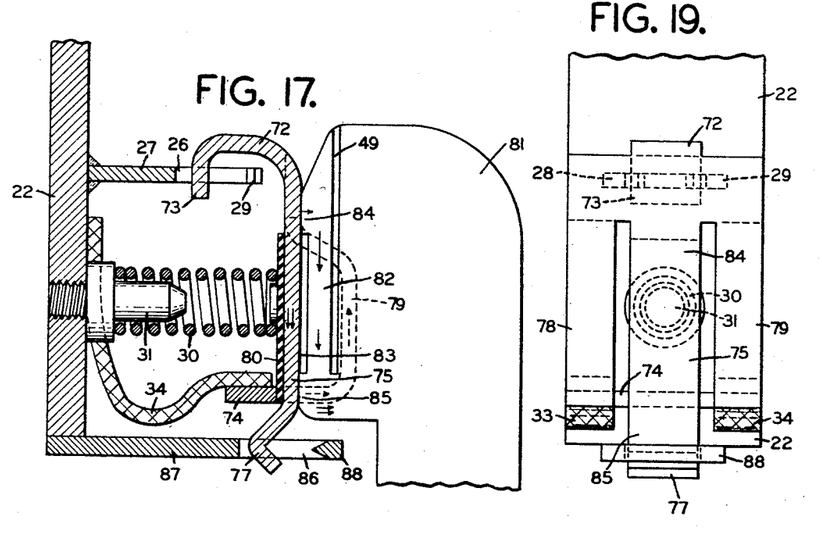
Fig. 17 is an elevational section, along line 17—17 of Fig. 18, partly in view, of an arrangement of the stationary and movable contact members in a circuit breaker, similar to that of Fig. 5, however based upon the principle illustrated in Fig. 4.
Fig. 19 is a front view of the arrangement of the stationary contact member, seen from the right hand side of Fig. 17 or 18.
Figure 18:
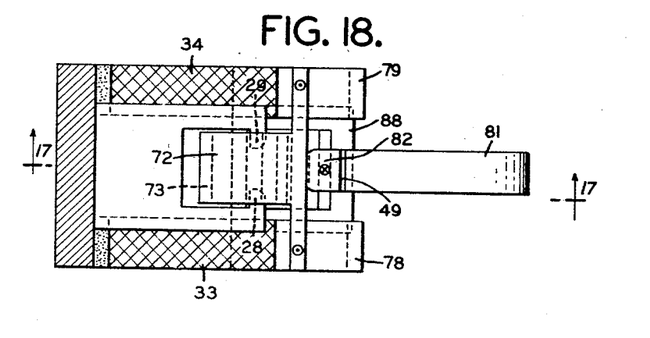
Fig. 18 is a top view thereof.

Figs. 17 to 19 illustrate another modification of the device of the invention based on the principle of Fig. 4 with the variation however that instead of four points or regions of contact, as in the preceding example, only two are employed.

The stationary contact 72 consists of a single leaf of sheet metal properly bent and cut. The branches or wings 78, 79 of the stationary conductor are cut and bent, starting from the upper part 72 of the contact member and, for imparting greater stability to the upper part of the structure, are connected at their foot end by a bridge 74 of one piece with the wings. The bridge is slipped over the tail piece 77 of the stationary contact piece, as Figs. 17 and 19 illustrate, and bears against the central part 75 of the stationary contact. Great rigidity towards the right is thus imparted to the structure.

The movable contact member 81 is provided with a narrow slot 49 as described hereinbefore with reference to Figs. 11 to 16, thus providing the current path 82. A slight depression 83 in the edge face of the movable contact 81 subdivides the contact making face into two regions of contact 84 and 85 connected by a substantially rectilinear current path.

It will readily be seen that in this embodiment again, the incoming conductor branches 78, 79 form with the outgoing conductor 82, as seen projected upon the plane of the drawing or as seen upon the median symmetry plane of the movable contact, a closed loop. The conductors 78, 79 and the conductive path 82 lead the current in opposite directions and thus repulse each other, whilst the currents in the conductors 82 and 75 flow in the same sense so that the conductors attract each other. All of the conductors, since the conductors of the first group are crossed to form a closed loop and those of the second group are not crossed, co-operate to increase the pressure between the contacts.

In order to avoid an undesired shunting of the current between piece 75 and bridge 74, which would disturb the desired reaction or operations, an insulating cover or coating 80 is applied to the piece 75 thus electrically insulating this piece from contact with bridge 74.

During the opening operation of the circuit breaker, both contacts are displaced towards the right under the action of spring 30. In the course of this movement, the tail 77 of the stationary contact, moving within the slot 86 of the foot piece 87 of the framework 22, first abuts against the stop 88 at the end of slot 86. This will cause separation of the contacts at the contact region 85, the contacts will open without drawing an arc since they still are shunted through the lines of contact at region 84.

The stationary contact under the action of spring 30 tends to continue its movement and pivots about the stop 88 until the downwardly bent end 73 of contact piece 72, at the end of its travel through the guide slot 26, abuts against the prongs 28, 29, and further movement of the stationary contact member is finally stopped.

The arc is now drawn between the contacts at their tops above contact region 84, thus at a zone remote and at a distance from the permanent contact regions.

Through the mutual arrangement of the conductive paths 78, 79 and the conductive path 82, the arc is energetically blown, upwards in Fig. 17, and rapidly extinguishes.

I claim:

1. In an electric switch, the combination of a stationary and a movable contact, and of a stationary and a movable conductor respectively ending at said contacts and having respectively substantially rectilinear length portions extended parallel and close to each other when the switch is closed, said movable conductor constituting the carrying arm of said movable contact and being disposed in position to react magnetically in closed position of the contacts with said stationary conductor in a direction to urge said movable contact against said stationary contact, the two conductors, at least upon initial opening movement of the contacts and formation of an arc, forming with their ends, nearest to the contacts, said contacts and said arc a loop, whereby the magnetic forces of the current tend to expand said loop and thus to repel the arc.

2. In an electric switch, the combination of a stationary and a movable contact and of a stationary and a movable conductor respectively ending at said contacts and having respectively substantially rectilinear length portions extended parallel and close to each other when the switch is closed as seen projected upon a plane parallel to their direction and to the direction of initial separation of the contacts, said movable conductor constituting the carrying arm of said movable contact, said conductors furthermore, as seen projected upon said plane, crossing each other near said contacts and the ends of said rectilinear length portions adjacent thereto, without contacting each other, thus forming a closed loop with the arc, upon initial opening movement of the movable contact, whereby the magnetic forces of the current tend to expand the loop and thus repel the arc.

3. Device including the combination as set forth in claim 1, wherein the common direction of the parallel conductors is perpendicular to the direction of initial separation of the contacts.

4. Device including the combination as set forth in claim 1, wherein one of said conductors is constituted by two branches whose projections upon a plane parallel to the direction of the initial separation of the contacts are symmetrically disposed at both sides of the projection upon this plane of the other, single conductor, and whose projections upon said median symmetry plane through said single conductor coincide.

5. Device including the combination as set forth in claim 2 wherein each contact is subdivided into two distinct contact regions in spaced relationship to each other, one of said contact regions of each contact being disposed at the end of the appertaining conductor, the second contact region of one contact being provided, near the remote end of the rectilinear length portion of the appertaining conductor, the second contact region of the other contact being connected to the first contact region thereof by a supplementary conductor having a substantially rectilinear length portion parallel to the rectilinear length portions of the appertaining conductors, the two contact regions of the stationary contact and the two contact regions of the movable contact thus being connected by a pair of conductors having parallel, not crossed, substantially rectilinear length portions leading the current in the same direction, the conductor assembly as a whole, in proximity to said contacts, thus increasing the pressure between the contacts of the stationary and movable contacts.

6. A circuit interrupter comprising in combination a frame, a contact secured to said frame, a pair of parallel laterally spaced conductors connected at one extremity to said contact, an arm swingable within the spacing between and parallel to the conductors as seen projected on a plane parallel to the direction of initial separation, the said arm and the said conductors crossing each other twice as seen on said plane, once adjacent the said contact and a second time adjacent the remote ends of the said conductors, thereby forming an elongated loop, the said contact formed to extend in part at least parallel to the said arm adjacent the first recited crossing to form a second loop upon initial separation and arc formation whereby the magnetic force resulting from current flow tends to expand the second loop and break the arc.

7. A device of the type described comprising stationary and movable contact members, stationary and movable conductors respectively ending at said contacts, one of said conductors being single, the other one of said conductors being constituted by two branch conductors symmetrically disposed at the sides of the single conductor as seen projected upon a plane normal to the direction of initial separation of the contacts; all of said conductors having substantially rectilinear length portions extended, as seen projected upon said plane, parallel to one another, said branch conductors, furthermore, as seen projected upon the median symmetry plane of the movable member, crossing said single conductor at least once, without contacting the same, near said contacts and near the ends of said rectilinear length portions, said conductors thereby being so disposed relatively to said contacts as to lead the current in the rectilinear length portions of the branch conductors in the one direction and in the rectilinear length portion of the single conductor in the opposite direction to develop repulsive forces between said single conductor and said branch conductors whereby the pressure between the contacts of said members is increased.

8. A device of the type described comprising stationary and movable contact members, stationary and movable conductors respectively ending at said contacts, one of said conductors being single, the other one of said conductors being constituted by two branch conductors symmetrically disposed at the sides of the single conductor as seen projected upon a plane normal to the direction of initial separation of the contacts; all of said conductors having substantially rectilinear length portions extended, parallel to one another as seen projected on said plane, said branch conductors as seen projected upon the median plane of symmetry of the movable member crossing said single conductor at least once without contacting the same; said branch conductors and said single conductor being shaped with contacting faces disposed so as to provide regions of contact between both contact members symmetrically disposed at both sides of the median plane of symmetry through the single conductor; said conductors thereby being disposed relatively to said contacts so as to lead the current in the rectilinear length portions of the branch conductors in the one direction and in the rectilinear length portion of the single conductor in the other direction, repulsive forces thus being developed between the single conductor and the branch conductors whereby the pressure between the contacts of said members is increased.

9. Device as set forth in claim 8, wherein said single conductor and said branch conductors are shaped and disposed at said contacting faces so as to provide lines of contact between two contact regions disposed at the single conductor and two contact regions disposed at said branch conductors, said regions being located symmetrically at both sides of said median symmetry plane.

10. Device as set forth in claim 8, wherein, as seen in projection upon said median symmetry plane, said single conductor and said branch conductors overlap each other in form of half loops with said rectilinear length portions parallel to each other.

11. Device as set forth in claim 8, wherein the movable conductor is a blade and said branch conductors are leaves of sheet metal branched from a common contact piece of said stationary contact member.

12. Device as set forth in claim 11, wherein the regions of contact of both contact members are disposed so as to provide lines of contact in a plane perpendicular to said median symmetry plane.

13. Device as set forth in claim 8, wherein the movable conductor is a blade having a contact edge constituted by two regions of contact inclined towards each other under an angle, and wherein said stationary contact member is composed of a pair of leaves of sheet metal joined together at one end and diverging therefrom in V-form under an angle corresponding to the angle of said contact edge of the blade, thereby to constitute a pair of regions of contact.

14. Device as set forth in claim 11, wherein at least said blade is provided with a narrow slot perpendicularly and transversely of said median symmetry plane and disposed so as to provide, extended from the region of contact of said blade, said rectilinear length portion.

15. Device as set forth in claim 8, wherein said contacting faces are shaped with interrupted lines of contact so as to provide at each conductor at least two distinct regions of contact connected by rectilinear conductor length portions.

16. Device as set forth in claim 15, wherein both branch conductors and the single conductor are provided each with a narrow slot perpendicularly and transversely of said median symmetry plane and disposed in opposite directions, so as to define at said conductors said parallel rectilinear conductor length portions.

17. Device as set forth in claim 8, wherein said movable contact is pivotably and said stationary contact member is displaceably mounted at the framework of the apparatus, a spring being disposed between said framework and said displaceable contact member thereby to press the same, in the closed position, against the movable contact member.

18. Device as set forth in claim 17, wherein guiding and stroke limiting means for said displaceable contact are provided at said framework disposed, so as when the movement of the movable member is started, to allow the displaceable contact member to displace itself, to follow the path and accompany the motion of the contact of the movable contact member.

19. Device as set forth in claim 18, wherein said stroke limiting means are disposed at said guiding means so as to stop the displacement of the displaceable contact when the movable contact member has moved a predetermined path and thus has reached a predetermined velocity, thereby to ensure a prompt opening of the contacts.

References Cited in the file of this patent

UNITED STATES PATENTS

| | | |
|---|---|---|
| Re. 18,257 | Paul | Nov. 24, 1931 |
| 1,762,604 | Ainsworth | June 10, 1930 |
| 1,854,990 | Hilliard | Apr. 19, 1932 |
| 1,958,159 | Bresson | May 8, 1934 |

FOREIGN PATENTS

| | | |
|---|---|---|
| 508,684 | Germany | Oct. 1, 1930 |
| 560,368 | Germany | Oct. 1, 1932 |